Dec. 15, 1970   W. KASTEN   3,547,719

METHOD OF MAKING AN END CLOSURE

Original Filed Aug. 17, 1966   2 Sheets-Sheet 1

INVENTOR
WALTER KASTEN

BY Thomas J. Plante

ATTORNEY

Dec. 15, 1970   W. KASTEN   3,547,719
METHOD OF MAKING AN END CLOSURE
Original Filed Aug. 17, 1966   2 Sheets-Sheet 2
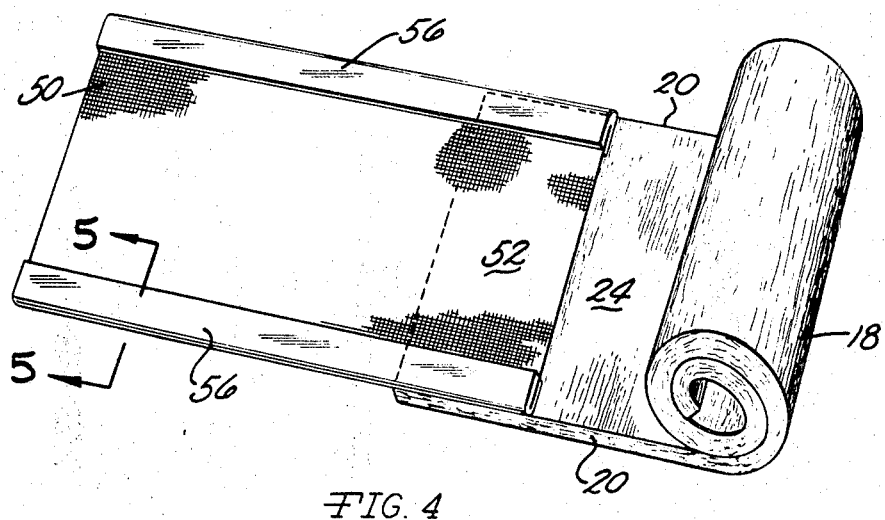
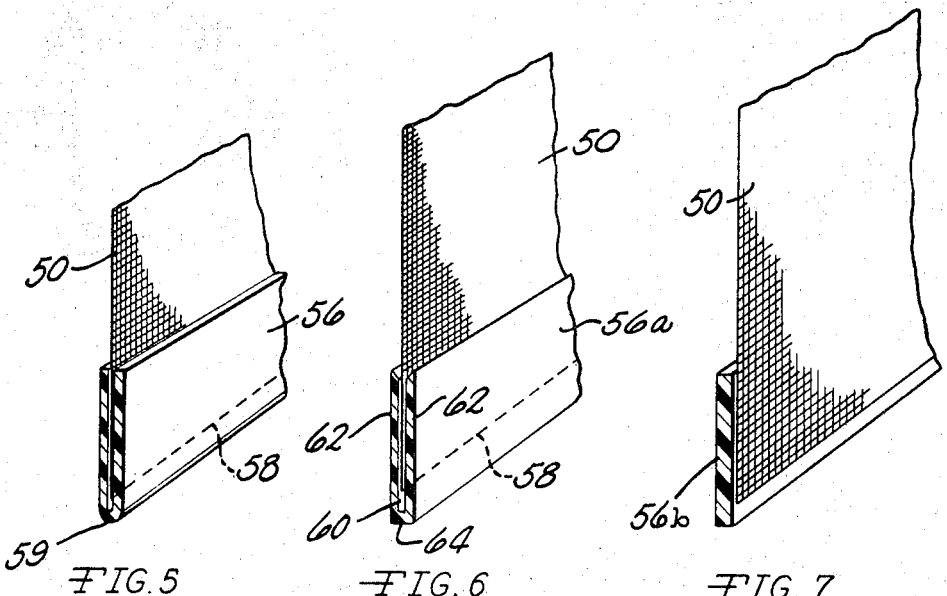
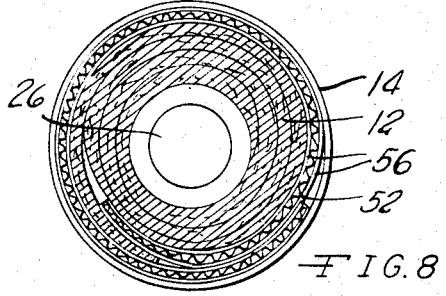
INVENTOR
WALTER KASTEN
BY Thomas J. Plante
ATTORNEY United States Patent Office 3,547,719
Patented Dec. 15, 1970

3,547,719
METHOD OF MAKING AN END CLOSURE
Walter Kasten, Franklin, Mich., assignor to The Bendix Corporation, a corporation of Delaware
Original application Aug. 17, 1966, Ser. No. 572,967, now Patent No. 3,415,384, dated Dec. 10, 1968. Divided and this application Apr. 10, 1968, Ser. No. 736,875
Int. Cl. B65b *11/28*
U.S. Cl. 156—69      3 Claims

ABSTRACT OF THE DISCLOSURE

The method of making an element for removing contaminants from liquid comprising the placing of a strip of thermoplastic material in a tubular body of porous material so that the strip extends to an interface of the body. Spin welding a cap of thermoplastic material to the end face of the body so that the thermoplastic strip becomes integral with the end cap to provide the necessary fluid-tight seal between the end cap and body.

---

This invention relates generally to the art of fluid purification and more particularly to a method of making an improved element for removing contaminants from liquid. This application is a division of my copending application Ser. No. 572,967, filed Aug. 17, 1966, now Pat. No 3,415,384.

Elements of the type to which this invention relates are commonly used in fuel filters for removing water and other impurities from the fuel. Such an element, illustrated in U.S. Pat. No. 2,707,563 dated May 3, 1955, includes a tubular body of porous material having end caps attached thereto. The end caps, which are non-porous and carry the element seals, have often been formed of metal and been cemented to the ends of the tubular body, as shown in the above-identified patent. Sometimes the end caps have been formed of a moldable material molded to the ends of the tubular body. However, neither of these constructions has been found to be capable of rapid or automatic production. Also, unless a fluid tight seal is obtained between the end caps and the body, the ability of the element to function effectively is adversely affected, and in both of the above constructions such a fluid tight seal is difficult to obtain consistently. It is an object of this invention, therefore, to provide an improved element for removing contaminants from liquid and method of making same which lends itself to rapid automated production and provides for bonding of the end caps to the element body so as to provide the necessary fluid tight seal. The invention is equally applicable to filter elements, which remove solid contaminants, and coalescer elements, which cause minute droplet sof water in the fuel to coalesce and form large droplets, and is described hereinafter with specific reference to a coalescer element only to facilitate explanation.

The coalescer element of this invention has end caps formed of a suitable thermoplastic material which is rigid at room temperature but becomes semi-fluid or plastic when heated. The tubular coalescer body, which is primarily a mass of fibrous material, is provided with thermoplastic strips of the same material as the end caps, or at least a material having similar thermoplastic properties. The strips are located at the end faces of the tubular body and extend completely about the body axis. The end caps are then "spin welded" to the body by relatively rotating the end caps and the body with the end caps in frictional engagement with the body end faces and the thermoplastic strips in the body end faces. The resultant frictional forces create sufficient heat to melt the end cap surfaces which engage the body and also to melt the portions of the strips at the body end faces. Relative rotation is then suddenly terminated, the engaged cap surfaces and body faces and strips remaining in contact, the melted portions then being allowed to cool and solidify so that the end cap surfaces bond to the body end faces and the end caps and the strips become integral and provide a fluid tight seal extending about the body axis at the end faces. In one form of the invention, the thermoplastic strips are wrapped with a bat of fibrous material which is spirally wrapped to form the tubular porous body. As a result, the strips are disposed in spiral formations at the end faces of the body. In other forms of the invention, the thermoplastic strips are attached to the edges of a screen which constitutes the final wrap on the porous body so that it extends about the fibrous material. In both cases the strips extend completely about the body axis to form the necessary fluid tight seal between the body and the end caps so as to prevent fluid flow between the end caps and the body end faces.

Further objects, features and advantages of this invention will become apparent from a consideration of the following description, the appended claims, and the accompanying drawing in which:

FIG. 4 is a perspective view similar to FIG. 3 showing the assembly of the thermoplastic strips with the screen which constitutes the final wrap on the porous body according to a modified form of the method of this invention; and FIGS. 5–7, inclusive, illustrate different methods of mounting the thermoplastic strips on the screen in the method shown in FIG. 4.

FIG. 8 is a transverse sectional view of coalescer element constructed according to the modified form of the method of this invention illustrated in FIG. 4.

Figure 1:
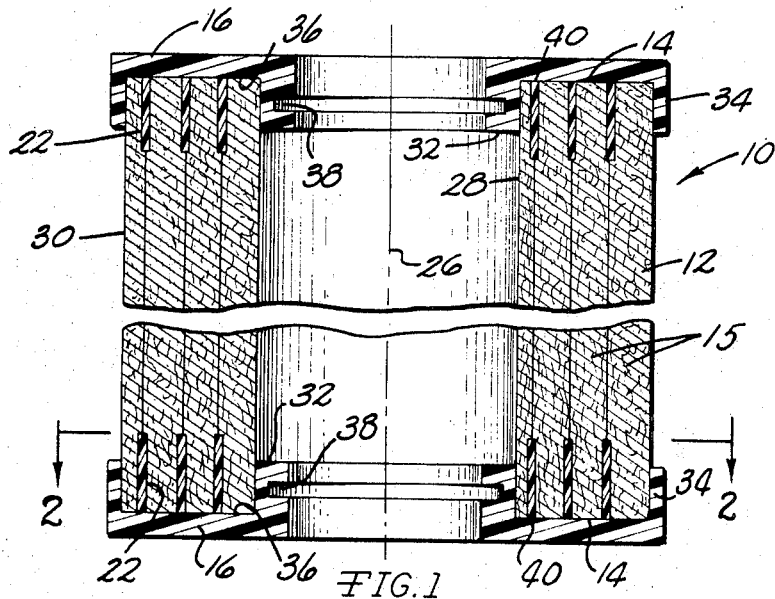
FIG. 1 is a vertically shortened axial sectional view of the improved coalescer element of this invention.
Figure 3:
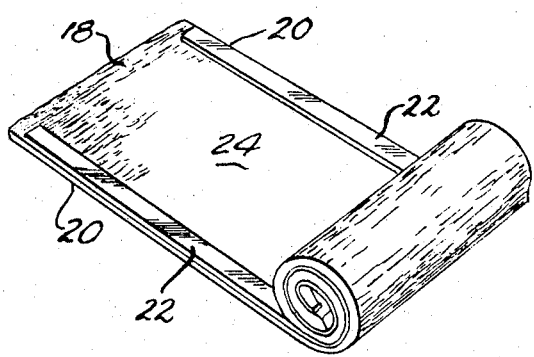
FIG. 3 is a perspective view showing the wrapping of a bat of fibrous material with the thermoplastic strips according to one form of the method of this invention.

With reference to the drawing, the improved coalescer element of this invention, indicated generally at 10, is illustrated in FIG. 1 as consisting of a tubular porous body 12 having end faces 14, and end caps 16 which are secured to the end faces 14 in a fluid tight sealed relation with the body 12. The body 12 is formed of a fine fibrous mass of material, such as fiberglass, which is originally in the form of an elongated bat 18 (FIG. 3) having edges 20. The bat 18 is spirally wrapped, as illustrated in FIG. 3, to form the tubular body 12 with a plurality of layers 15, the edges 20 of the bat 18 forming the faces 14 of the tubular body 12.

Figure 2:
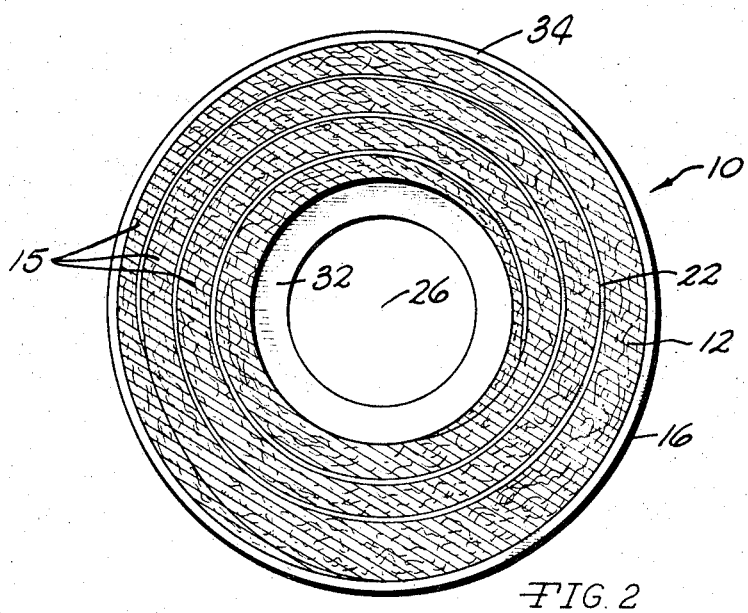
FIG. 2 is a transverse sectional view of the coalescer element of this invention as seen from substantially the line 2—2 in FIG. 1.

In one form of the coalescer element of this invention, strips 22 of a thermoplastic material, are laid on one side 24 of the bat 18 prior to spiral wrapping of the bat. As shown in FIG. 3, the strips 22 are much narrower than the bat 18, and when the bat 18 is spirally wound to form the body 12, the strips 22 are firmly clamped between the adjacent layers 15 of the bat 18 formed during spiral wrapping. Each strip 22 extends spirally about the axis 26 of the body 12 and is positioned so that one edge 40 of the strip 22 is located at one of the faces 14. In a commercial form of the coalescer element 10 of this invention, tubular porous members may be disposed against the radially inner and outer sides 28 and 30, respectively, of the body 12, as illustrated in U.S. Pat. No. 2,707,563 previously referred to herein, but such elements are omitted from the disclosure of the form of the invention shown in FIGS. 1–3 since they are not pertinent to the invention disclosed therein.

The end caps 16 have axially inwardly extending inner and outer flanges 32 and 34 which fit over and engage the body surfaces 28 and 30, respectively, and flat surfaces 36 which engage the end faces 14. The end caps are provided with radial grooves 38 for carrying the seals (not shown) which form a part of a commercial coalescer element. The end caps 16 are formed of a thermoplastic material and are secured to the body end faces 14 by initially positioning the surfaces 36 of the end caps 16 in engagement with the body faces 14 and relatively rotating the body 12 and the end caps 16 so as to create frictional forces on the end cap surfaces 36 and the body end faces 14. This relative rotation is maintained for a period long enough to allow the frictional forces to heat the end cap surfaces 36 and the strip edges 40 sufficiently to cause melting thereof. In other words, the end cap surfaces 36 and the strip edges 40 are heated sufficiently by this rubbing action to become plastic or semi-fluid. The relative rotation is then suddenly stopped and the strips 22 and the end caps 16 are allowed to cool. The result is that the fibrous portions of the body 12 at the end faces 14 become embedded in the end cap surfaces 36 so as to effectively bond the end faces 14 to the end caps 16. In addition, the strips 22 and the surfaces 36 melt into each other sufficiently to become practically integral with each other and provide for a fluid tight seal between each end cap 16 and the body 12, with this seal extending completely about the body axis 26. These seals positively preclude travel of fluid between the body end faces 14 and the end caps 16 which would negate the function of the coalescer element 10.

In the modified form of the coalescer element of this invention, the method of manufacture of which is illustrated in FIGS. 4 and 5, a screen 50, preferably formed of fiber glass, of sufficient length to be wrapped more than one full wrap about the body 12, is positioned so that one end portion 52 of the screen 50 is laid on the surface 24 of the bat 18 adjacent the end 54 of the bat 18. When the screen 50 is then spirally wrapped with the bat 18, it will constitute the final wrap in the body 12 and will extend completely about the radially outer surface 30 of the body 12. According to the method of this invention disclosed in FIGS. 4 and 5, thermoplastic strips 56, similar to the strips 22, are folded over the opposite edges 58 of the screen 50 prior to assembly of the screen 50 with the bat 18. As a result, when the bat 18 is fully spirally wrapped, to form the body 12, the fold 59 (FIG. 5) in a strip 56 of the thermoplastic material will be disposed at each face 14 of the body 12 and will extend completely about the axis 26 of the body 12 at the radially outer surface 30 thereof. Consequently, the body end faces 14 can be "spin-welded" to the end caps 16, as described above in connection with the description of the form of the invention shown in FIG. 1, so that the strips 56 become integral with the end cap surfaces 36. Thus, in both the forms of this invention, illustrated in FIGS. 1 and 4, thermoplastic strips 22 and 56 are provided in the body 12 so that they extend to the faces 14. This enables spin-welding of the thermoplastic endcaps 16 to the thermoplastic strips in the porous body 12.

FIG. 6 illustrates the assembly of a modified strip 56a, similar to the strip 56 previously described, with an edge 58 of the screen 50. The strip 56a is of extruded generally U-shape form having leg portions 62 separated by a narrow slot 60 and a base portion 64 which connects the leg portions 62. In the assembly of a strip 56a with the screen 50, the edge 58 of the screen 50 is inserted in the slot 60 to a position adjacent the base portion 64. In FIG. 7 still another method of mounting a thermoplastic strip on the screen 50 is illustrated. A strip 56b, which can be about half as wide as the strip 56, is heat sealed to one side of the screen 50 so that it extends beyond the edge 58 thereof. Thus, in the forms of the invention illustrated in FIGS. 5, 6, and 7, alternate methods of attaching the thermoplastic strips to the edges of the screen 50 are provided. In all forms, the strip thus becomes an integral part of the body 12, and after spin-welding to the endcaps 16 becomes integral with the endcaps 16, to thereby provide the necessary fluid tight seal between the endcaps 16 and the body 12.

From the above description, it is seen that this invention provides an improved coalescer element 10 in which the endcaps 16 are effectively welded to the porous body 12 so as to provide a fluid tight seal therebetween. Since this welding is accomplished merely by relative rotation of the endcaps 16 and the body 12, with the thermoplastic strips attached thereto, the coalescer element 10 of this invention lends itself to automatic and rapid production according to any one of the improved methods disclosed herein.

It will be understood that the element for removing contaminants from liquid and method of making same which are herein disclosed and described are presented for purposes of explanation and illustration and are not intended to indicate limits of the invention, the scope of which is defined by the following claims.

1. A method for attaching an end cap formed of thermoplastic material and an end face of a tubular porous body consisting essentially of layers of fibrous material in a fluid tight relation, said method comprising the steps of:
 (a) providing thermoplastic strip means in said body extending to said end face and completely around the axis of said body,
 (b) relatively rotating said end cap and said body with a surface of said end cap and said body end face in frictional engagement sufficiently to cause said end cap surface and said strip means at said end face to become heated sufficiently to become plastic, and
 (c) discontinuing said relative rotation and cooling said end cap and said strip means while in engagement to thereby bond said end cap to said end face and to said strip means at said face.

2. The method according to claim 1 in which said tubular porous body is formed and provided with said thermoplastic strip means by the steps of:
 (a) rolling a bat of fibrous material into multi-layer tube shape so that one edge of said bat forms said end face of said body; and
 (b) positioning said strip means on one side of said bat and adjacent said one edge thereof during rolling of at least a portion of said bat.

3. The method according to claim 1 in which said tubular porous body is formed and provided with said thermoplastic strip means by the steps of:
 (a) rolling a bat of fibrous material of predetermined width into multi-layer tube shape;
 (b) wrapping a porous screen of substantially said predetermined width about said rolled bat so that one of the edges of said bat and said screen form said body end face; and
 (c) mounting said thermoplastic strip means on said one screen edge.

References Cited
UNITED STATES PATENTS

| | | | |
|---|---|---|---|
| 2,663,660 | 12/1953 | Layte | 210—493 |
| 2,742,160 | 4/1956 | Fogwell | 210—494X |
| 2,942,748 | 6/1960 | Anderson | 156—73X |
| 3,013,667 | 12/1961 | Jackson | 210—493 |
| 3,042,571 | 7/1962 | Jackson | 210—493 |
| 3,058,513 | 10/1962 | Schaub | 156—73X |
| 3,245,858 | 4/1966 | Megoro | 156—73X |
| 3,261,516 | 7/1966 | Allen | 156—73X |
| 3,316,135 | 4/1967 | Brown | 156—73X |
| 3,385,741 | 5/1968 | Allen | 156—73X |
| 3,446,688 | 5/1969 | Flax | 156—69X |

CARL D. QUARFORTH, Primary Examiner

A. J. STEINER, Assistant Examiner

U.S. Cl. X.R.

156—73